(12) United States Patent
Zhu et al.

(10) Patent No.: US 11,092,759 B2
(45) Date of Patent: Aug. 17, 2021

(54) OPTICAL FIBER CONNECTING DEVICE

(71) Applicant: Amphenol Fiber Optic Technology (Shenzhen) Co., Ltd., Shenzhen (CN)

(72) Inventors: Ling-Hua Zhu, Shenzhen (CN); Xing-Fu Mo, Shenzhen (CN); Jinan Zhou, Shenzhen (CN); Anh Nguyen, Shenzhen (CN)

(73) Assignee: Amphenol Fiber Optic Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/701,410

(22) Filed: Dec. 3, 2019

(65) Prior Publication Data

US 2021/0003791 A1 Jan. 7, 2021

(30) Foreign Application Priority Data

Jul. 3, 2019 (TW) .................................. 108208631

(51) Int. Cl.
  *G02B 6/38* (2006.01)
  *G02B 6/44* (2006.01)
  *G02B 6/54* (2006.01)

(52) U.S. Cl.
  CPC .......... *G02B 6/3873* (2013.01); *G02B 6/3849* (2013.01); *G02B 6/3894* (2013.01); *G02B 6/4465* (2013.01); *G02B 6/54* (2013.01)

(58) Field of Classification Search
  CPC .. G02B 6/3624; G02B 6/3849; G02B 6/3866; G02B 6/3873; G02B 6/3894
  See application file for complete search history.

(56) References Cited

U.S. PATENT DOCUMENTS

| | | | | |
|---|---|---|---|---|
| 7,264,402 | B2* | 9/2007 | Theuerkorn | G02B 6/3851 |
| | | | | 385/59 |
| 10,185,098 | B2* | 1/2019 | Jiang | G02B 6/3825 |
| 10,215,929 | B2* | 2/2019 | Yan | G02B 6/3821 |
| 10,481,342 | B1* | 11/2019 | Yang | G02B 6/3866 |
| 10,551,571 | B2* | 2/2020 | Liu | G02B 6/3825 |
| 2007/0160327 | A1* | 7/2007 | Lewallen | G02B 6/3885 |
| | | | | 385/53 |
| 2011/0188813 | A1* | 8/2011 | Marcouiller | G02B 6/3849 |
| | | | | 385/78 |
| 2019/0227244 | A1* | 7/2019 | Huang | G02B 6/3825 |

FOREIGN PATENT DOCUMENTS

| | | | | |
|---|---|---|---|---|
| CN | 210119604 U | * | 2/2020 | ............... G02B 6/38 |
| CN | 210270275 U | * | 4/2020 | ............... G02B 6/38 |
| CN | 210270276 U | * | 4/2020 | ............... G02B 6/38 |
| JP | 2013105048 A | * | 5/2013 | ............... G02B 6/38 |

\* cited by examiner

*Primary Examiner* — Daniel Petkovsek
(74) *Attorney, Agent, or Firm* — Michael Best & Friedrich LLP

(57) ABSTRACT

A optical fiber connecting device includes a hollow main body and a dust-proof unit. The hollow main body includes a first hollow inserting portion for insertion of a fiber optic connector, a second hollow inserting portion oppositely of the first hollow inserting portion, and a flange between the first and second hollow inserting portions. The second hollow inserting portion has a threaded outer surface. The dust-proof unit includes a dust-proof sleeve that has a threaded inner surface. The dust-proof sleeve is removably sleeved around the second hollow inserting portion by an inter-engagement of the threaded inner and outer surfaces.

5 Claims, 4 Drawing Sheets

OPTICAL FIBER CONNECTING DEVICE

CROSS-REFERENCE TO RELATED APPLICATION

This application claims priority to Taiwanese Patent Application No. 108208631, filed on Jul. 3, 2019.

FIELD

The disclosure relates to an optical fiber connecting device.

BACKGROUND

For multimedia transmission, there is an optical fiber connecting assembly provided in the prior art for use in connecting an optical fiber connector, such as a LC, MPO or SC type connector, with a multimedia cable connector, such as a fan-out connector. The optical fiber connecting assembly is composed of two component parts connected to each other and configured to respectively mate different types of optical fiber connectors.

Because the optical fiber connecting assembly is a two-piece structure, when it is used to connect two different connectors respectively coupled to fiber optic cables, the two component parts of the optical fiber connecting assembly has to be assembled by an operator working for cable installation, thereby requiring additional assembling time. In some applications, the cables are needed for placement in a cable conduit, and the optical fiber connecting assembly has to be inserted into the cable conduit. To avoid dusts from contaminating termination points of the cables, a dust-proof mechanism is additionally needed for assembly with the optical fiber connecting assembly during the pulling of the optical fiber connecting assembly into the cable conduit. Since the dust-proof mechanism is not provided as an essential original part of the optical fiber connecting assembly, it should be added during cable installation, thus adversely affecting the efficiency of cable installation.

SUMMARY

Therefore, an object of the disclosure is to provide an optical fiber connecting device that can alleviate at least one of the drawbacks of the prior art.

According to the disclosure, an optical fiber connecting device includes a one-piece hollow main body and a dust-proof unit.

The hollow main body defines an axis and includes a first hollow inserting portion extending around the axis for insertion of a fiber optic connector, a second hollow inserting portion extending around the axis oppositely of the first hollow inserting portion for insertion of another fiber optic connector, and a flange extending around the axis between the first and second hollow inserting portions. The second hollow inserting portion has a threaded outer surface.

The dust-proof unit includes a dust-proof sleeve that has a threaded inner surface. The dust-proof sleeve is removably sleeved around the second hollow inserting portion by an inter-engagement of the threaded inner and outer surfaces.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
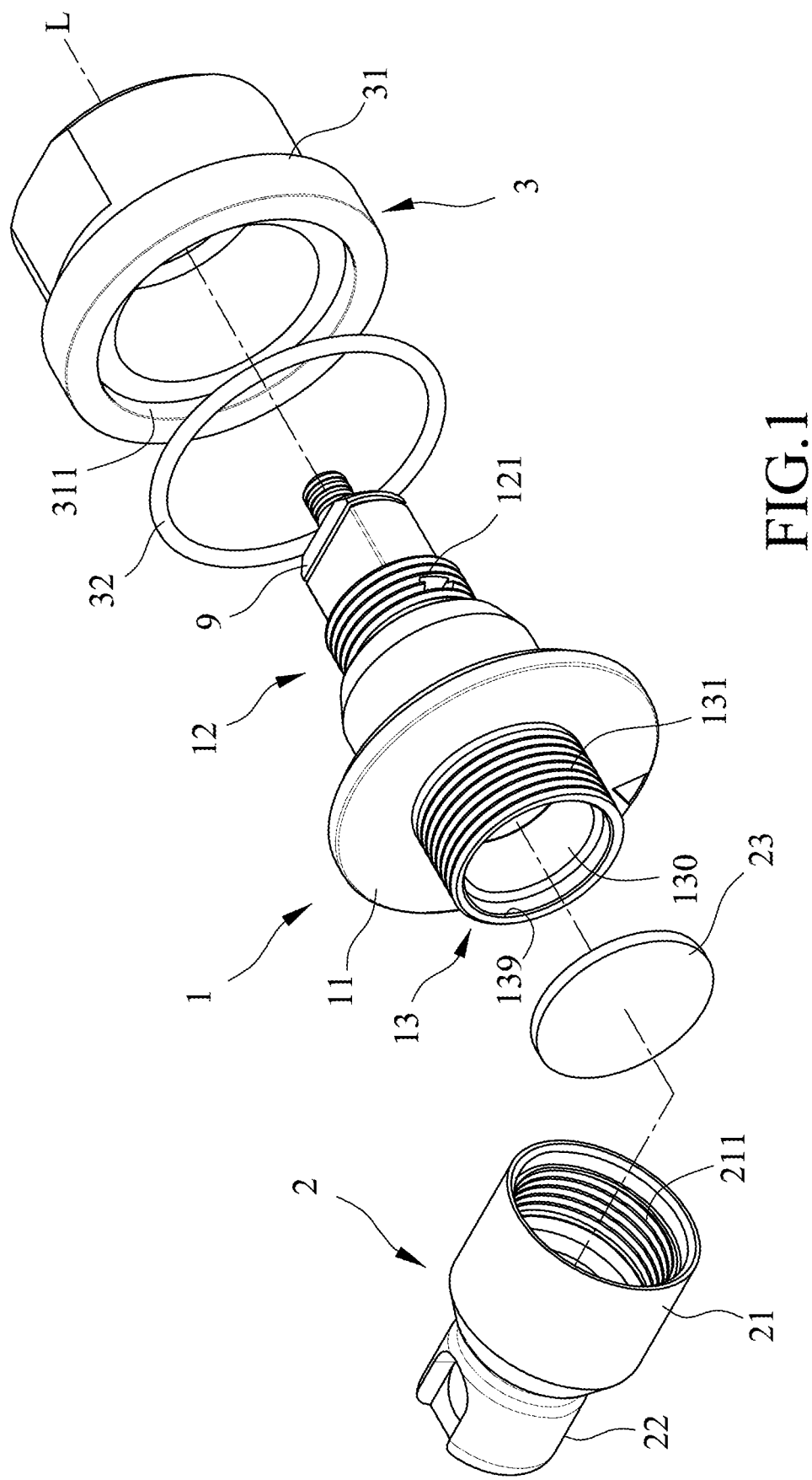
FIG. 1 is an exploded perspective view illustrating an embodiment of an optical fiber connecting device according to the disclosure.
Figure 2:
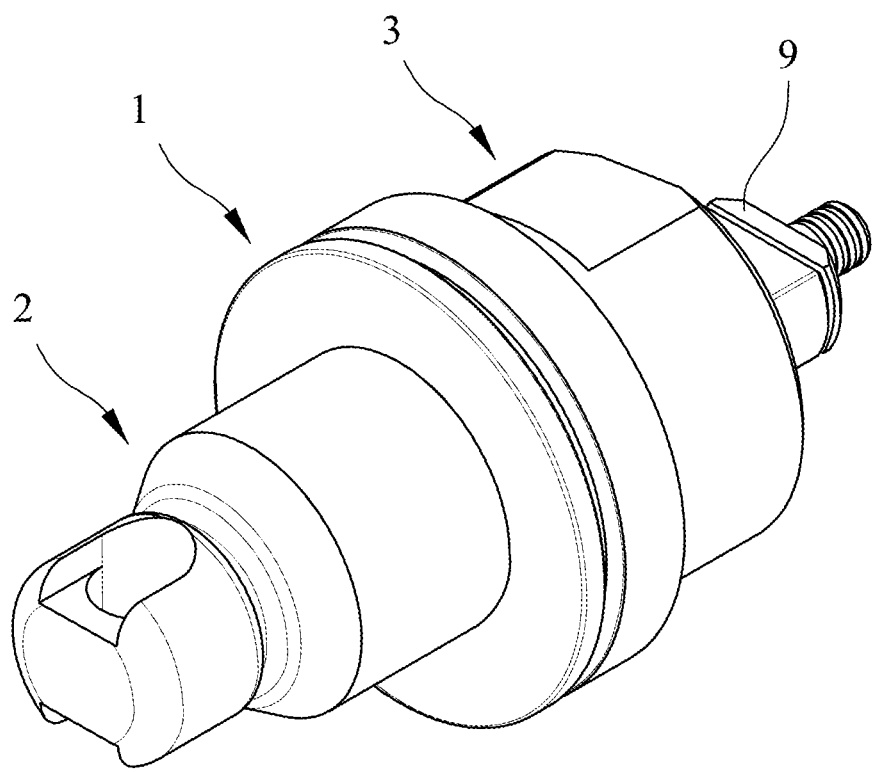
FIG. 2 is a perspective view of the embodiment.

FIGS. 1 and 2 illustrate an embodiment of an optical fiber connecting device according to the disclosure for coupling a fiber optic connector 9. The optical fiber connecting device includes a hollow main body 1, a dust-proof unit 2 and an outer sleeve unit 3. In this embodiment, the fiber optic connector 9 is an MPO connector.

The hollow main body 1 defines an axis (L), and includes a first hollow inserting portion 12 extending around the axis (L), a second hollow inserting portion 13 extending around the axis (L) oppositely of the first hollow inserting portion 12, and a flange 11 extending around the axis (L) between the first and second hollow inserting portions 12, 13. The first hollow inserting portion 12 is configured for insertion of the fiber optic connector 9, and has an outer threaded surface 121. The second hollow inserting portion 13 has a threaded outer surface 131, and an inner space 130 that has an open end 139. The second hollow inserting portion 13 is configured for insertion of another fiber optic connector (e.g., but not limited hereto, a fan-out connector).

The dust-proof unit 2 includes a dust-proof sleeve 21 that has a threaded inner surface 211, an end distal from the threaded inner surface 211 and formed with a pull ring 22, and a dust cover 23 sealing the open end 139. The dust-proof sleeve 21 is removably sleeved around the second hollow inserting portion 13 by an inter-engagement of the threaded inner and outer surrounding surfaces 211, 131. The dust cover 23 is made from a resilient material. To further prevent dusts from entering the inner space 130 of the second hollow inserting portion 13, the dust cover 23 abuts the open end 139 when the dust-proof sleeve 21 is sleeved around the second hollow inserting portion 13.

Figure 3:
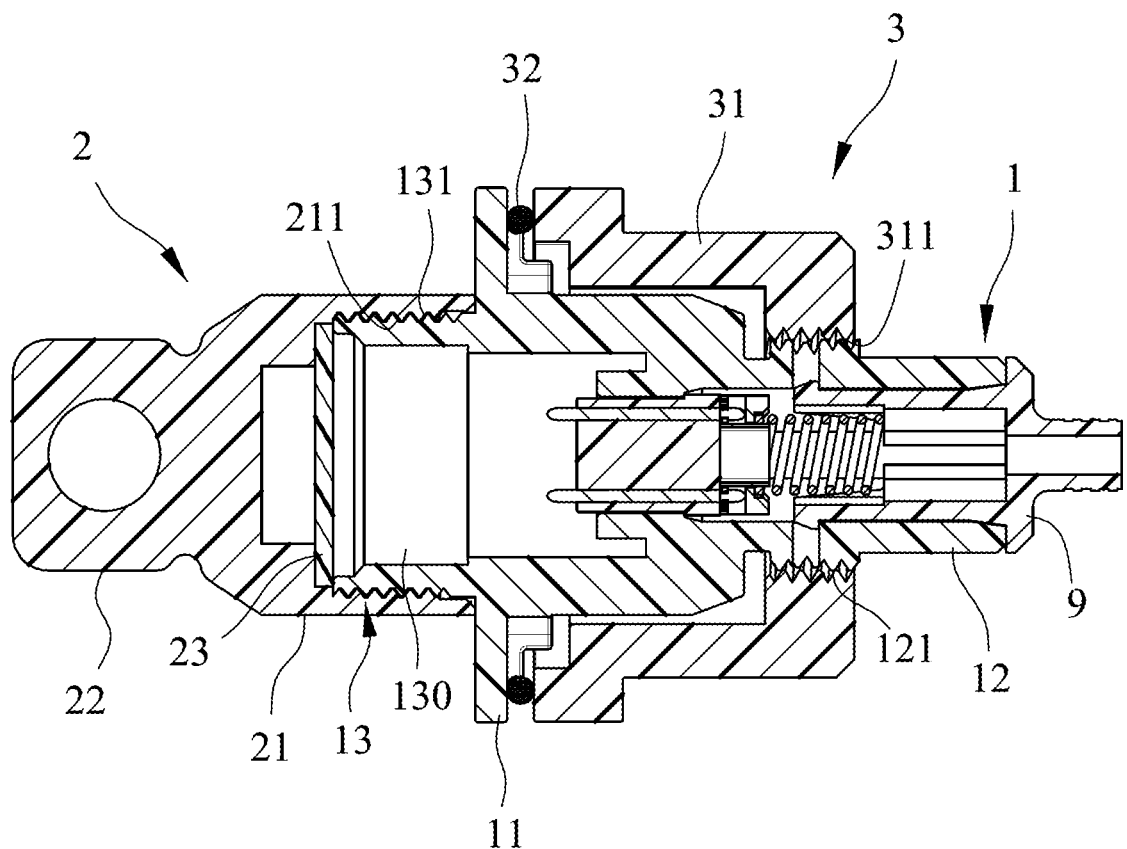
FIG. 3 is a sectional view of the embodiment.

Referring to FIG. 3, in combination with FIGS. 1 and 2, the outer sleeve unit 3 includes an outer sleeve 31 and seal ring 32. The outer sleeve 31 is disposed around the first hollow inserting portion 12 of the hollow main body 1. The seal ring 32 is sleeved around the first hollow inserting portion 12 and abuts between the flange 11 and the outer sleeve 31. In this embodiment, the outer sleeve 31 has an inner threaded surface 311 threadedly engaged with the outer threaded surface 121 of the first hollow inserting portion 12. By screwing the outer sleeve 31, the seal ring 32 can be placed in tight abutment with the open end 139 to seal the inner space 130 of the second insertion portion 13.

In this embodiment, the hollow main body 1 is a one-piece structure. It is unnecessary to assemble the first hollow inserting portion 12, which is configured to mate the fiber optic connector 9, with the second hollow inserting portion 13, which is configured to mate another fiber optic connector. Therefore, the optical fiber connecting device of the disclosure may save the time for assembling two component parts that are needed in the prior art.

Figure 4:
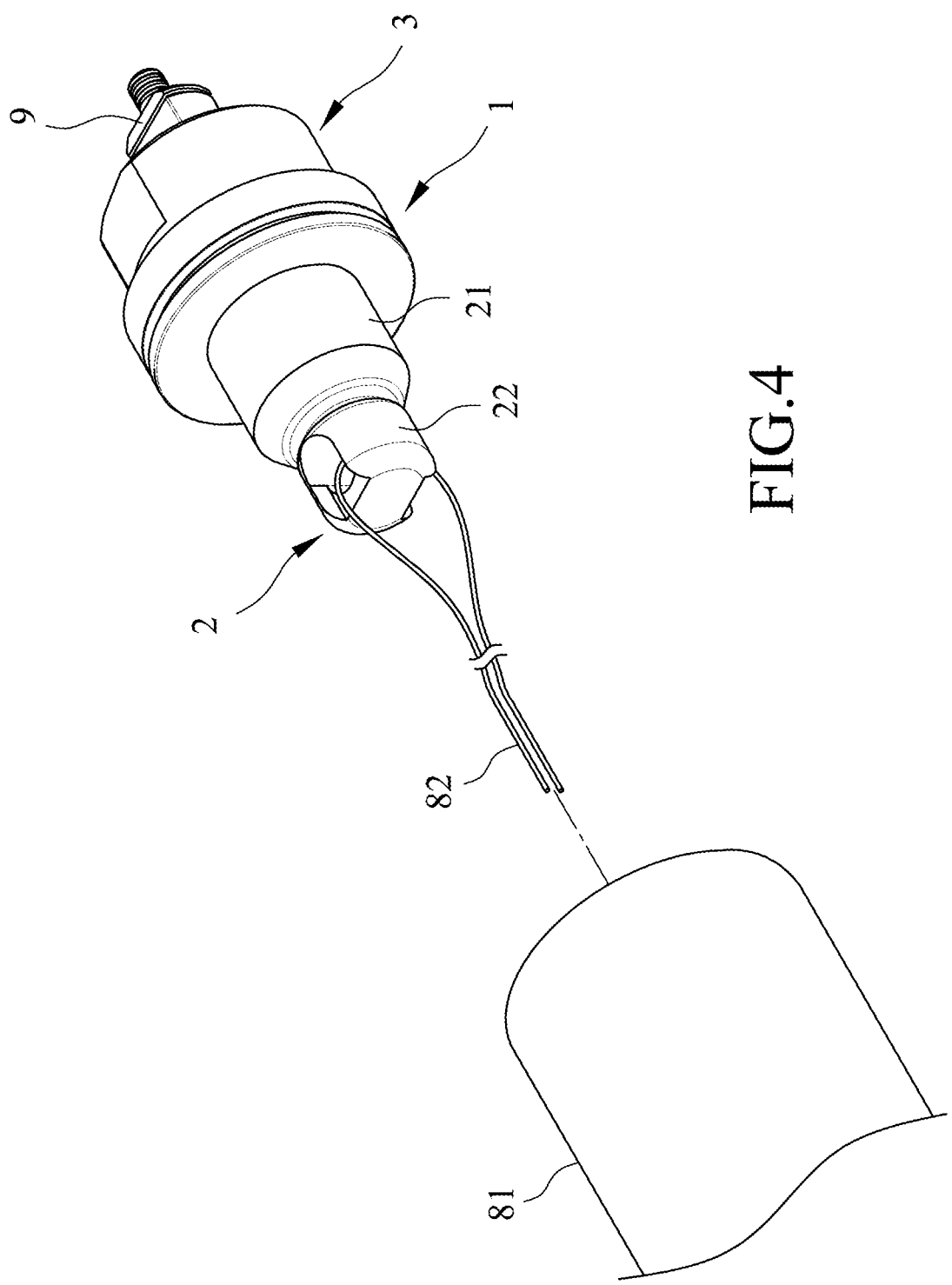
FIG. 4 is a fragmentary perspective view illustrating the optical fiber connecting device connected with a pulling string.

As shown in FIGS. 3 and 4, to insert the optical fiber connecting device into a cable conduit 81, the pull ring 22 of the dust-proof sleeve 21 sleeved on the hollow main body 1 is connected to a pulling string 82. Pulling the pulling string 82 can bring the optical fiber connecting device rapidly into the cable conduit 81. During insertion of the optical fiber connecting device, the dust-proof unit 2 prevents dusts from entering the inner space 130 of the second hollow inserting portion 13, thereby avoiding contamination of cable contact points.

By virtue of the threaded connection between the second insertion portion 13 and the dust-proof sleeve 21, the dust-proof unit 2 may be assembled quickly with the hollow main body 1 when necessary, and is able to provide the functions of dust-proofing and pulling the cable.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber connecting device comprising:
   a hollow main body defining an axis and including a first hollow inserting portion extending around said axis for insertion of a fiber optic connector, a second hollow inserting portion extending around said axis oppositely of said first hollow inserting portion for insertion of another fiber optic connector, and a flange extending around said axis between said first and second hollow inserting portions, said second hollow inserting portion having a threaded outer surface;
   a dust-proof unit including a dust-proof sleeve that has a threaded inner surface, said dust-proof sleeve being removably sleeved around said second hollow inserting portion by an inter-engagement of said threaded inner and outer surfaces;
   wherein said second hollow inserting portion surrounds an inner space that has an open end, said second hollow inserting portion further having an endmost face extending around said axis at said open end of said inner space;
   wherein said dust-proof unit further includes a dust proof cover that is formed as a plate made of a resilient sealing material and that spans and abuts said endmost face of said second hollow inserting portion; and
   wherein said dust-proof sleeve further has a cap portion that extends outwardly from said threaded inner surface of said dust-proof sleeve and said endmost face of said second hollow inserting portion, said cap portion of said dust-proof sleeve having an inner surface defining a receiving space proximate to said endmost face of said second hollow inserting portion, said dust-proof cover being received in said receiving space, and said inner surface pressing a periphery of said dust-proof cover against said endmost face of said second hollow inserting portion so as to seal said inner space of said second hollow inserting portion.

2. The optical fiber connecting device as claimed in claim 1, wherein said cap portion of said dust-proof sleeve has an end distal from said threaded inner surface and formed with a pull ring.

3. The optical fiber connecting device as claimed in claim 1, further comprising an outer sleeve disposed around said first hollow inserting portion of said hollow main body, and a seal ring sleeved around said first hollow inserting portion and abutting between said flange and said outer sleeve.

4. The optical fiber connecting device as claimed in claim 3, wherein said first hollow inserting portion has a forward part proximate to said flange, a rear part distal from said flange and smaller in cross section than said forward part, and an outer threaded surface formed around said rear part, said outer sleeve having an inner threaded surface threadedly engaged with said outer threaded surface of said first hollow inserting portion, and a front end disposed around said forward part of said first hollow inserting portion and pressing said sealing ring against said flange.

5. The optical fiber connector device of claim 1, wherein said inner surface of said cap portion of said dust-proof sleeve is stepped in close proximity to said endmost face of said second hollow inserting portion to provide a shoulder face that presses said dust-proof cover against said endmost face of said second hollow inserting portion.

\* \* \* \* \*